United States Patent [19]

Hyner et al.

[11] Patent Number: 4,713,855
[45] Date of Patent: Dec. 22, 1987

[54] PROCESS FOR MAKING SELF-DRILLING FASTENERS

[75] Inventors: Jacob Hyner, Waterbury; Steven Gradowski, Torrington, both of Conn.

[73] Assignee: Whyco Chromium Company, Inc., Thomaston, Conn.

[21] Appl. No.: 46,237

[22] Filed: May 4, 1987

Related U.S. Application Data

[62] Division of Ser. No. 808,514, Dec. 13, 1985, Pat. No. 4,692,080.

[51] Int. Cl.⁴ .............................................. B23G 9/00
[52] U.S. Cl. ................................................... 10/10 R
[58] Field of Search ................... 10/10 R, 10 P, 27 R; 411/386, 387, 900, 901, 902, 903, 908

[56] References Cited

U.S. PATENT DOCUMENTS

| 667,555 | 2/1901 | McGahan | 411/903 X |
|---|---|---|---|
| 1,717,388 | 6/1929 | Keeler | 10/10 R |
| 2,122,915 | 7/1938 | Olson | 411/386 |
| 2,712,261 | 7/1955 | Anderson | 411/487 |
| 3,355,205 | 11/1967 | Wagner et al. | 411/387 X |
| 3,884,116 | 5/1975 | Hage | 411/387 |
| 3,936,366 | 2/1976 | Green | 427/96 X |
| 3,948,739 | 4/1976 | Chaudhari et al. | 427/36 X |
| 3,989,610 | 11/1976 | Tsukada et al. | 427/54.1 X |
| 4,091,173 | 5/1978 | Hage | 411/914 |
| 4,188,459 | 2/1980 | Hyner et al. | 427/406 X |
| 4,203,690 | 5/1980 | Tanaka et al. | 407/119 |
| 4,395,173 | 7/1983 | Sygnator | 411/387 |

FOREIGN PATENT DOCUMENTS

| 26071 | of 1913 | United Kingdom | 411/902 |
|---|---|---|---|
| 811573 | 4/1959 | United Kingdom | 411/902 |
| 1204853 | 9/1970 | United Kingdom | 411/386 |

*Primary Examiner*—E. Michael Combs
*Attorney, Agent, or Firm*—DeLio & Associates

[57] ABSTRACT

A process for making self-drilling, screw fasteners having improved corrosion resistance. The process comprises applying a frangible radiation curable plastic coating over the drill tip corrosion prior to the deposition of a heavy resistant plating on the remainder of the screw. The invention is further directed to the product of the process.

12 Claims, 1 Drawing Figure

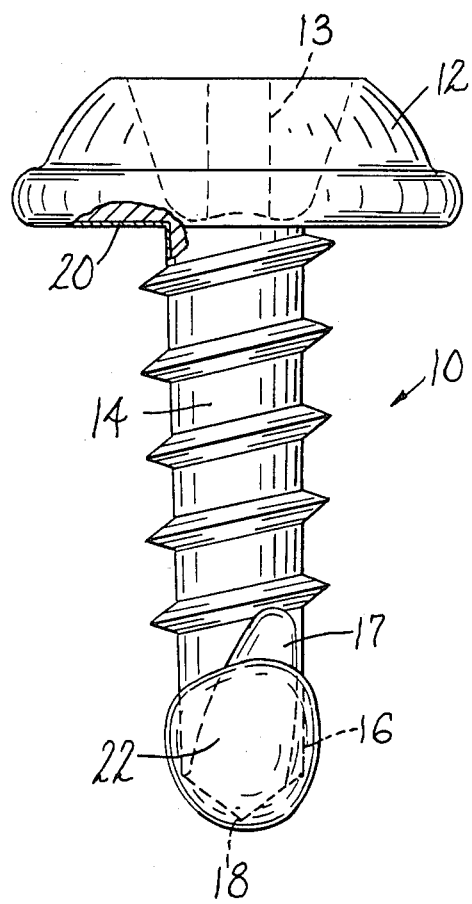

PROCESS FOR MAKING SELF-DRILLING FASTENERS

This is a divisional of co-pending application Ser. No. 808,514 filed on Dec. 13, 1985, U.S. Pat. No. 4,692,080.

BRIEF DESCRIPTION OF THE INVENTION

This invention relates to a process for making screw fasteners and more particularly to a process for making plated, self-drilling screws and to the product resulting from such a process.

There are a number of industrial applications where it is necessary to mount a relatively thin panel onto a member of an underlying frame. Among these are the mounting of body panels to the frame of an automobile, curtain walls to the structure of a building and paneling intended for use with large home appliances such as dishwashers and automatic washing machines. In many of these applications, such mounting is accomplished with screw fasteners.

In many operations where screws are used as fasteners, it is a practice to pre-drill and thread pilot holes to receive them. Where the structure is simple and the surfaces are readily accessible, such a practice does not impose much of an economic penalty. However, where the structure is more complex as on an automobile assembly line, or involves field work, as in automobile body shop work or in the building trades, the necessary tooling can be quite complicated and using such tooling can impose considerable time and cost penalties.

To simplify such work, self-drilling, screws are often used. These screws have the tip area configured as a drill point so that they can drill and tap their own pilot holes, thus offering a considerable reduction in assembly time. In the automobile industry, one common standard for using such screws is that they be inserted and seated in 3 seconds or less with a no more than 35 pound (15.9 kg) radial load driving force. Such a force is easily provided by a conventional heavy duty hand held electric or pneumatic drill.

Many of the above appliations for such screws involve long-term exposure to corrosive environments so the process for making ferrous metal screws, in particular, customarily includes the steps of plating the screws with one or more layers of electrodeposited copper, nickel and/or chromium and the like.

One problem with plated screws is that when it is necessary to provide a heavier than normal electroplate for service in highly corrosive environments and/or to meet extended liftime corrosion free requirements, the electromotive lines of force converging at the tip during the plating operation cause extremely heavy electrodeposits to form on the drill point. Such heavy deposits effectively round off and dull the drill point so that driving forces in excess of those normally applied will be required to insert and seat the screw, if it can be seated at all. In recognition of this problem, the above automobile industry standard for screws with plated tips is increased to allow a driving force of no more than 40 pounds (18.2 kg) radial load. To meet this standard, it is, however, often necessary to use relatively thin overall plating layers so as to limit the amount of plating build-up on the drill point. If greater driving forces are required, the "walking" of the drill point in the panel prior to piercing the surface tends to increase drilling time and to create disfigured, out-of-round holes of poor quality.

OBJECTS OF THE INVENTION

It is an object of the present invention to provide a new and improved process for making a self-drilling, screw fastener comprising coating the tip area of the screw with a frangible, quick curing resin and electroplating a corrosion resistant metal onto the remainder of the screw.

It is a further object of the present invention to provide a self-drilling, screw fastener having a frangible, coating on the tip of the screw and a heavy corrosion resistant plating on the remainder of the screw.

Still other objects and advantages will in part be obvious from the drawing and specification.

SUMMARY OF THE INVENTION

The present invention relates to a process for making a self drilling screw having a frangible polymeric coating on the drill point, which is applied before the screw is electroplated with a corrosion resistant metal. This coating, which is typified by being adherent, quick curing and resistant to the stresses of the subsequent plating operation, is also frangible so that it will break off upon the application of normal screw driving and seating forces. With such a coating over the drill point it is possible to deposit heavy, multi-layered plating onto the remaining parts of the screw without dulling the drill point.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the invention, reference is had to the following description taken in connection with the accompanying drawing.

BRIEF DESCRIPTION OF THE DRAWING

The FIGURE shows a front view of the self drilling screw of the present invention.

DETAILED DESCRIPTION OF THE INVENTION

FIG. 1 is an enlarged front view of an exemplary self-drilling screw 10 comprising a head 12, which is customarily impressed with either a lateral or crossed (Phillips head) slot 13 to facilitate engaging and driving the screw, into a post. The screw 10 also comprises a threaded shank 14, which may be either cylindrical or conical, and a tip area 16. In the present invention, tip area 16 is configured as a drill comprising a pair of flutes 17 and a drill point 18.

Where screw 10 is intended for service in extremely corrosive enviornments, the screw is plated with a metal 20 ranging in thickness from about 0.001 (0.025 mm) to about 0.003 inches (0.076 mm). In such instances plating 20 may be derived from a "system" comprised of a multiplicity of layers to impart particular enhanced corrosion resistant characteristics to the plated part. One such "system" is described in U.S. Pat. No. 4,188,459 issued to Hyner et al, which is incorporated by reference herein. The plating described therein comprises depositing over a ferrous metal substrate, in sequence, a first layer of an alloy which has a microthrowing power, a second layer of cadmium, cadmium-tin alloy, a dual layer of cadmium and tin, zinc or a zinc alloy, a third layer of copper, a fourth layer of nickel and a final layer of chromium or a metallic chromium-substitute. In this system the micro-throwing layer is either nickel-cadmium, nickel-zinc, iron-cadmium, iron-zinc, cobalt-cadmium, cobalt-zinc or a ternary or quaternary alloy containing iron, nickel or cobalt in combination with cadmium and/or zinc. Other plating systems capable of applying such heavy electro-deposits to threaded fasteners are commercially available and the present invention is not limited as to which of these may be used.

One characteristic of all electrolytic plating processes is that the electromotive lines of force tend to concentrate at pointed projections on the part being plated. The result of such concentration is that extra heavy plating thicknesses are deposited onto such pointed projections. In the case of screw 10 this would be at tip area 16 and the effect of such a plating build-up (typically on the order of three to four times the average thickness of the plated deposit on the remainder of the screw) is the dulling of drill point 18 to an amount where the screw often cannot be used. In many applications, such a problem is avoided by keeping the metal thickness deposited to a maximum of about 0.001 (0.025 mm) to about 0.0012 inches (0.03 mm). However, by so doing the long term corrosion resistance of the screw may be compromised. In the process of the present invention, such a plate buildup is prevented while retaining the other beneficial characteristics of heavy plated screws. When proceeding according to the present invention, tip area 16 is coated with a radiation curable plastic compound 22 before the screw is plated. A number of plastic coating materials suitable for this purpose have been developed and are commercially available. Typical of these are compounds described by Green in U.S. Pat. No. 3,936,366 Chaudhari et al, in U.S. Pat. No. 3,948,739 and Tsukada et al., in U.S. Pat. No. 3,989,610. All of these materials are capable, upon being exposed to a beam of actinic or ionizing radiation of a proper wavelength and intensity, of curing to a solid plastic in a matter of a few seconds at most. Some will even cure in fractions of a second. Of these, UV curable resins such as triallyl cyanurate are preferred. By controlling the thickness of such resins to be between about 0.01 (0.25 mm) and about 0.1 (2.54 mm) inches, the cured coating is found to be frangible so that under proper conditions it will break off cleanly.

For a high speed operation such as that involved in producing the screws of the present invention, a practical curing time is considered to be 2 seconds or less. Ultraviolet generation equipment suitable to cure the coating in such time is readily available. When so cured, coating 22 is hard, acid and solvent resistant and has good adhesion. Such plastic coating easily withstand the various tresses imposed by the subsequent plating process, so that heavy plating thicknesses is in the range of up to about 0.003 inches (0.076 mm) can be readily applied.

Where necessary, adhesion of the coating can be improved by first cleaning tip 16 to remove any residual traces of cutting oil, grease and other contamination and "roughening" it with a commercial phosphate pre-coating compound, such as that provided by the Detrex Chemical Company under the trade name "1020-CN", before the resin coating is applied. Such roughening may also be provided by mechanical means such as sanding or grinding, but chemical treatment is preferred.

No special processing equipment is needed to provide such resin coatings. Conventional processing equipment can be used to clean and phosphate precoat the screws in bulk and standard vibratory feeders can be readily adapted to allow the screw tips to pass through pans or trays containing the plastic resin coating material. The thickness of the resin coating applied will depend on such factors as the time of travel through the resin and resin viscosity. Subsequent electroplating is also carried out by normal process techniques. It is recognized that subsequent handling after plating may cause some or all coating 22 to crack and/or break off. At this stage, such a happening will have essentially no effect on the utility of the finished screw.

Accelerated corrosion tests with such screws indicate that the head and threaded shank portions of self drilling screws having a heavy plating as made possible by the process disclosed herein will meet a ten-year corrosion free service lifetime requirement.

In use, the driving force required to insert and seat a screw made in accordance with the present invention is found to be increased by no more than 2% over that which would be required for uncoated, unplated screws of similar design. Further, it is found that under drilling pressures, the plastic coating, when present, quickly breaks off and is swept away from the hole area so that hole quality is not degraded.

It will thus be seen that the objects set forth above, among those made apparent from the preceding description are efficiently attained and, since certain changes may be made in carrying out the above method and in the article set forth without departing from the spirit and scope of the invention, it is intended that all matter contained in the above description and shown in the accompanying drawing shall be interpreted as illustrative and not in a limiting sense.

We claim:

1. A process for making a screw fastener having a head, a shank and a tip area configured as a drill point comprising, applying a quick curing resin coating over the tip area of said fastener while leaving the remaining head and shank portion uncoated, curing said resin coating to form a frangible layer on said tip area and electroplating a corrosion resistant metal onto the uncoated remaining head and shank portion of the screw.

2. The process of claim 1 further comprising the steps of cleaning the screw and roughening the tip area prior to applying the resin coating.

3. The process of claim 2 wherein said roughening step is performed by chemically applying to said tip area a phosphate pre-coating compound.

4. The process of claim 1 wherein said resin coating is selected from the class consisting of UV curable resins, IR curable resins and ion beam curable resins.

5. The process of claim 1 wherein the thickness of the resin coating is between about 0.01 inches (0.25 mm) and about 0.10 inches (2.5 mm).

6. The process of claim 1 wherein curing is accomplished by exposing the resin to ultraviolet light of a sufficient intensity so that it will cure to form a solid frangible plastic coating in about 2 seconds or less.

7. The process of claim 1 wherein the electroplated metal is between about 0.001 inches (0.025 mm) and about 0.003 inches (0.076 mm) in thickness.

8. A process for making a screw fastener having a head, a shank and a tip area configured as a drill point comprising cleaning the screw fastener, roughening the tip area of the fastener, applying a quick curing resin coating over the tip area, said resin coating being selected from the class consisting of UV curable resins, IR curable resins and ion beam curable resins, curing said resin coating to form a frangible layer on said tip area and electroplating a corrosion resistant metal onto the uncoated remaining head and shank portion of the screw.

9. The process of claim 8 wherein said roughening step is performed by chemically applying to said tip area a phosphate pre-coating compound.

10. The process of claim 8 wherein the thickness of the resin coating is between about 0.01 inches (0.25 mm) and about 0.10 inches (2.5 mm).

11. The process of claim 8 wherein curing is accomplished by exposing the resin to ultraviolet light of a sufficient intensity so that it will cure to form a solid frangible plastic coating in about 2 seconds or less.

12. The process of claim 8 wherein the electroplated metal is between about 0.001 inches (0.025 mm) and about 0.003 inches (0.076 mm) in thickness.

* * * * *

UNITED STATES PATENT AND TRADEMARK OFFICE
CERTIFICATE OF CORRECTION

PATENT NO. : 4,713,855
DATED : December 22, 1987
INVENTOR(S) : Jacob Hyner and Steven Gradowski It is certified that error appears in the above-identified patent and that said Letters Patent are hereby corrected as shown below:

In the Description

Column 1, line 42, delete "appliations" and substitute --applications--
Column 1, line 51, delete "liftime" and substitute --lifetime--
Column 2, line 56, delete "enviornments" and substitute --environments--
Column 3, line 55, delete "tresses" and substitute --stresses--

Signed and Sealed this

Thirtieth Day of August, 1988

Attest:

DONALD J. QUIGG

*Attesting Officer*     *Commissioner of Patents and Trademarks*